United States Patent

[11] 3,610,560

| [72] | Inventor | Alan G. Dillabough<br>615 Idlewood Drive S.E., Salem, Oreg. 97302 |
|---|---|---|
| [21] | Appl. No. | 881,643 |
| [22] | Filed | Dec. 3, 1969 |
| [45] | Patented | Oct. 5, 1971 |

[54] LITTER BAG HOLDER
7 Claims, 7 Drawing Figs.

[52] U.S. Cl. .................................................. 248/97, 248/153, 297/192
[51] Int. Cl. ...................................................... B65b 67/12
[50] Field of Search ........................................... 248/97, 98, 99, 150

[56] References Cited
UNITED STATES PATENTS

| 2,269,257 | 1/1942 | Edwards .................... | 248/101 X |
| 2,574,442 | 11/1951 | Turner ........................ | 248/175 X |
| 2,904,295 | 9/1959 | Patterson .................... | 248/97 |
| 2,907,538 | 10/1959 | Stahmer ..................... | 248/97 |

FOREIGN PATENTS

| 1,120,352 | 12/1961 | Germany ..................... | 248/97 |

Primary Examiner—Chancellor E. Harris
Attorney—Oliver D. Olson

ABSTRACT: The upwardly inclined front section of an open rectangular wire frame mounts laterally spaced bearings which pivotally support the ends of a wire bail. The upper ends of the front section and bail releasably secure the open end portion of a litter bag for adjustment between open and closed conditions, and the closed end of the bag is secured releasably to the rear end of the frame. The assembly is adapted for support upon an automobile body floor for removable storage under the front seat.

PATENTED OCT 5 1971
3,610,560
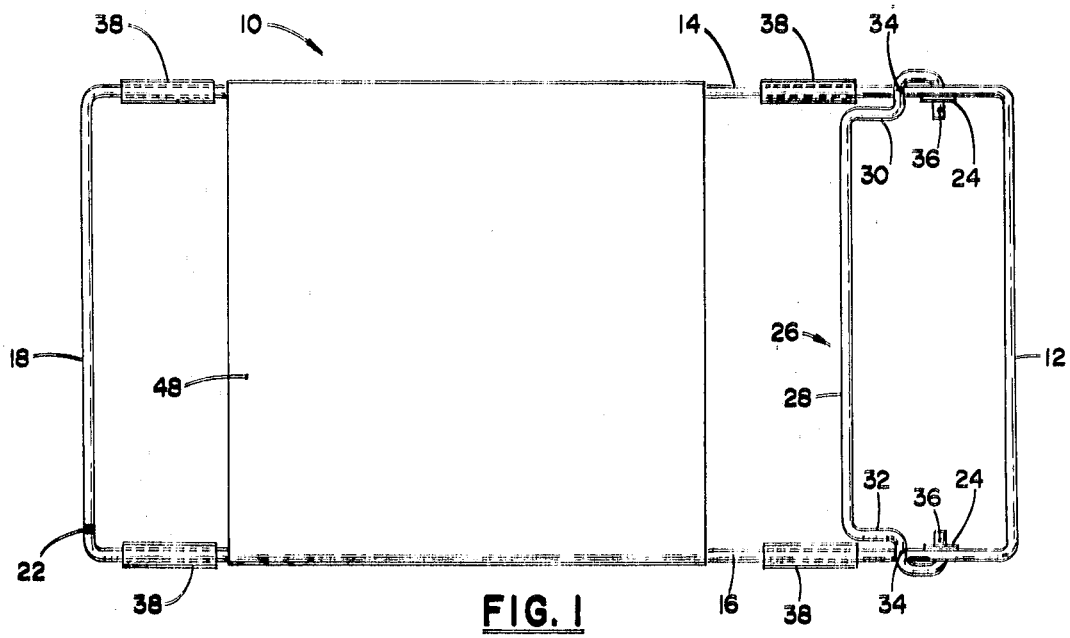
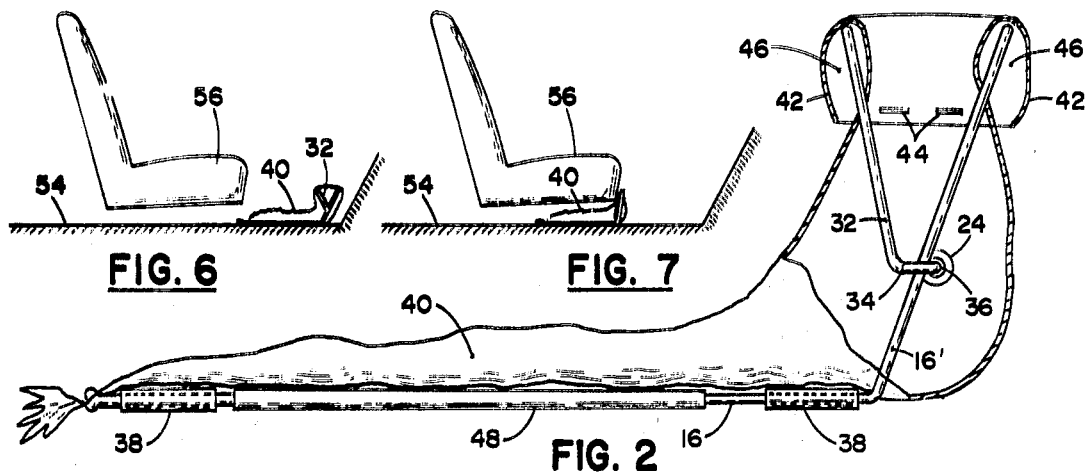
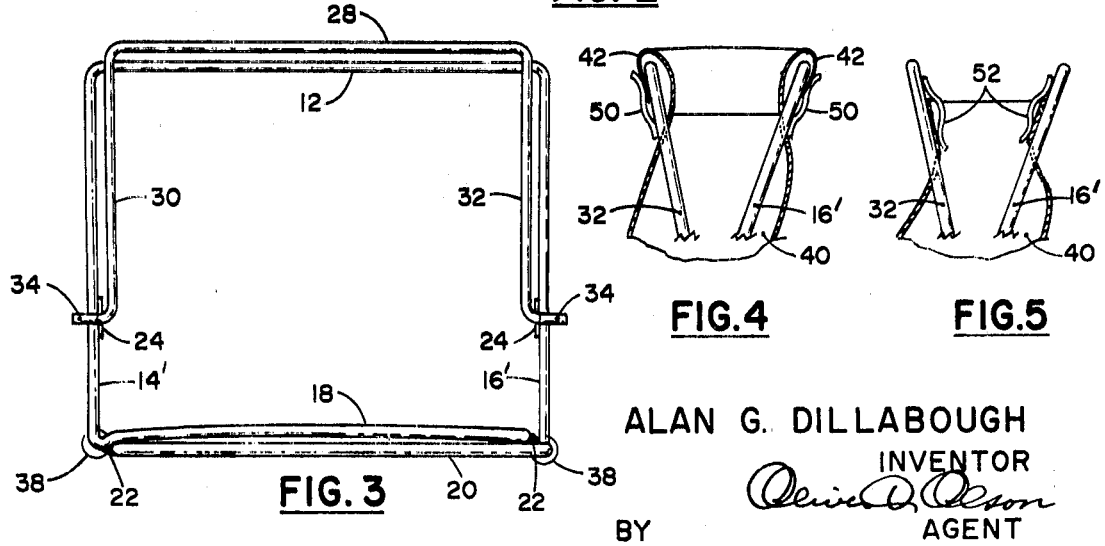
ALAN G. DILLABOUGH
INVENTOR
BY  AGENT

LITTER BAG HOLDER

BACKGROUND OF THE INVENTION

This invention relates to holders for supporting litter bags in automobiles, and more particularly to a litter bag holder adapted for removable storage under the front seat of an automobile.

Temporary storage of litter in automobiles has been provided heretofore in a variety of ways. Litter containers have been weighted for stable support on the floor. However, such containers are quite costly, and their location on the floor constitutes an obstacle and inconvenience to occupants of the automobile. They also require frequent removal for cleaning.

Disposable litter bags have been provided heretofore with openings by which to hang them from door knobs or other projections within the automobile. Because of the limited number of such projections available for this purpose, such litter bags generally are positioned inconveniently, or in the way of occupants of the automobile. Moreover, they tend to tear or become disengaged from their supporting projections, resulting in spillage of the litter throughout the automobile. Other forms of litter bags have been provided with adhesive by which to secure them to smooth surfaces within automobiles. However, because of the limited number of areas available for adhesive attachment, such litter bags also generally are located inconveniently for use, or in the way of the occupants. They also tend to become detached.

SUMMARY OF THE INVENTION

In its basic concept, the present invention provides a holder by which a litter bag may be supported upon an automobile body floor for removable storage under the front seat and by which the open end of a litter bag may be opened for deposit of litter and closed during storage.

It is by virtue of the foregoing basic concept that the principal object of this invention is achieved; namely, to overcome the disadvantages associated with prior litter containers and bags, as exumerated hereinbefore.

Another important object of this invention is the provision of a litter bag holder of the class described by which ordinary paper bags may be utilized for the storage of litter.

Another important object of this invention is the provision of a litter bag holder of the class described which is of simplified construction for economical manufacture.

The foregoing and other objects and advantages of this invention will appear from the following detailed description, taken in connection with the accompanying drawing of the preferred embodiments.

BRIEF DESCRIPTION OF THE DRAWING

FIG. 1 is a plan view of a litter bag holder embodying the features of this invention.

FIG. 2 is a view in side elevation of the holder of FIG. 1 showing its association with a deposable litter bag, a portion of the latter being broken away to disclose details of assembly.

FIG. 3 is an end elevation as viewed from the left in FIG. 2.

FIGS. 4 and 5 are fragmentary views in side elevation illustrating alternative means by which to secure the open end of a litter bag detachably to the holder, the litter bag being shown in section.

FIGS. 6 and 7 are schematic views in side elevation of the front seat compartment of an automobile showing, in FIG. 6, the litter bag holder in extended position forwardly of the front seat with the litter bag open for reception of litter and, in FIG. 7, the litter bag holder in retracted position under the front seat with the bag closed for storage of litter.

DESCRIPTION OF THE PREFERRED EMBODIMENT

In the embodiment illustrated in FIGS. 1-3 the holder includes a frame 10 preferably made of a single length of wire bent to form an open rectangle. Thus, the bent wire provides a front transverse end section 12, laterally spaced side sections 14, 16 and a pair of lapping transverse rear end sections 18, 20. The terminal ends of the rear end sections are secured each to the other lapping section, as by the welds 22, adjacent the side sections. In this manner the intermediate lapping sections are resiliently deflectable toward and away from each other, to provide a clamp for releasably securing the closed end of a litter bag, as explained more fully hereinafter.

The side sections are bent angularly intermediate their ends to provide rearward portions 14, 16 defining a base frame section and forward portions 14', 16' defining a forward frame section which inclines angularly upward from the rearward base frame section (FIG. 2).

Intermediate the ends of the inclined portions 14', 16' of the side sections there are provided a pair of pivot bearings. In the embodiment illustrated these are provided by annular washers 24 welded or otherwise secured to the wire sections. However, they may be provided by other means, such as by forming loops in the wires.

The pivot bearings 24 support a bail member 26 pivotally for movement toward and away from the transverse frame section 12. In the embodiment illustrated the bail member is formed from a single length of wire which is bent to provide an intermediate transverse top section 28 and laterally spaced leg sections 30, 32. The lower portion of each leg section is bent to substantially U-shape to provide an outwardly projecting stop section 34 and an inwardly extending pivot section 36. The pivot sections are mounted removably in the bearings 24 with the stop sections 34 arranged to intercept the adjacent side sections 14', 16' of the frame to limit the degree of opening of the bail relative to the top section 12 of the frame.

Antifriction means preferably is provided on the base frame section to minimize sliding of the holder on the floor of an automobile body. In the embodiment illustrated, such means is provided by one or more lengths of rubber tubing 38 or adhesive tape wrapping on each base portion 14, 16 of the wire side sections of the frame.

The support described hereinbefore functions to support a litter bag 40, as follows: The open end of a plastic or paper bag is folded outwardly back upon itself to form a peripheral cuff 42. If desired, the lapped portions adjacent the sides of the bag may be secured together to prevent unfolding. If the bag is made of plastic, the sections may be secured together by the staples 44 illustrated (FIG. 2), or by heat sealing, solvent bonding, adhesive, or other means. Adhesive or staples may be used if the bag is made of paper. In an event, there is a pair of opposed pockets 46 which are open in the direction facing the bottom of the bag.

Accordingly, with the bail 26 moved to the open position illustrated in FIG. 2, the bag is drawn through the space between the bail and top section 12 of the frame and the upper portions of the frame and bail are inserted into the opposed pockets 46 formed by the cuff 42 at the open end of the bag. The lapping rear transverse sections 18, 20 of the frame then are spread apart and the closed end of the bag threaded between them. Upon release of the lapping sections, they are moved resiliently toward each other effectively to clamp the closed end of the bag between them.

If desired, a sheet of paper, plastic, cloth or other suitable material may be provided to extend across the open portion of the base section of the frame, to support the underside of the litter bag. In the embodiment illustrated, such a support is provided by the sheet 48 which is supported by and extends between the side wire sections 14, 16. However, it will be apparent that the base section of the frame may be made of a solid plate to which the open front section of the frame may be attached. The front section and bail must be of open construction in order to receive the litter bag between the sides thereof.

FIGS. 4 and 5 illustrate alternative means for securing the open end of the litter bag to the upper portions of the frame and bail. In FIG. 4 resilient clip members 50 are welded or otherwise secured to the side sections of the wire frame and bail adjacent the upper transverse sections thereof, with the open ends of the clips facing upward. Thus, the open end of a litter bag is folded outward back upon itself, as previously explained but without the necessity of securing the lapped sections together, and the outer cuff portions 42 are drawn under the clips which secure them against displacement.

In FIG. 5 similar resilient clips 52 are welded or otherwise secured to the side wires of the frame and bail adjacent the upper transverse sections, with the open ends of the clips facing downward. The open end of a litter bag thus is drawn upwardly under the clips for releasable attachment to the holder, without the necessity of providing a cuff at the open end of the bag.

Clips similar to those illustrated in FIGS. 4 and 5 may be provided at the rear end of the frame, in place of the lapping transverse sections 18 and 20, to secure the closed end of a litter bag, as will be understood.

In use, the assembled litter bag and support is placed upon the floor 54 (FIGS. 6 and 7) in the front seat compartment of an automobile. When not in use, the bail 26 is pivoted forwardly to ward the top section 12 of the frame, to close the open end of the bag, and the assembly then is slid under the front seat 56, with the inclined forward portion of the holder and bag abutting the front edge of the seat, as illustrated in FIG. 7.

When it is desired to deposit litter in the bag, the assembly is slid forward from the position illustrated in FIG. 7 to a position illustrated in FIG. 6. The bail 26 is moved rearward to the position illustrated in FIG. 2, to open the open end of the bag for a deposit of litter. Thereafter the bail is moved to close the open end of the bag and the assembly then is slid rearward under the front seat to the storage position illustrated in FIG. 7.

It will be apparent to those skilled in the art that various changes in size, shape, type and arrangement of parts described hereinbefore may be made without departing from the spirit of this invention.

Having now described my invention and the manner in which it may used,

I claim:

1. A litter bag and holder combination for removable storage under the front seat of an automobile, comprising
   a. a frame having an elongated horizontal base section for reception under the front seat of an automobile and an upwardly extending front section for positioning adjacent the front edge of the front seat of an automobile, the front section being substantially shorter in length than the base section,
   b. an elongated litter bag of flexible material having a closed end and an open end, and
   c. means releasably interengaging the upper end of the front section and the bag adjacent said open end for movement of said open end between open and closed positions,
   d. the bag extending downward from said open end and thence horizontally rearward to the rear end of the base section, whereby a major portion of the length of the bag is disposed horizontally for reception under the front seat of an automobile,
   e. the end of the base section opposite the front section releasably engaging the bag adjacent said closed end for securing the bag against lateral displacement relative to the base section.

2. The combination of claim 1 wherein the means releasably interengaging the upper end of the front section and the bag adjacent said open end includes a bail member mounted on the frame for pivotal movement toward and away from the upper end of the front section, the upper ends of the front section and bail member being proportioned and arranged to secure releasably thereto the open end of a litter bag for movement of the latter between open and closed positions.

3. The combination of claim 2 wherein the frame comprises a single length of wire defining a front transverse section, spaced side sections and a rear transverse section, and the open portion of the bag is provided with opposed pockets removably receiving therein the upper ends of the front section and bail member.

4. The combination of claim 3 wherein the open end portion of the bag is folded to form the opposed pockets.

5. The combination of claim 4 including means securing the folded portion to the bag at the ends opposite the pockets.

6. The combination of claim 1 wherein the frame comprises a single length of wire defining a front transverse section, spaced side sections and a rear transverse section, and the open end portion of the bag is provided with a pocket removably receiving therein the upper end portion of the front section of the frame.

7. A litter bag holder, comprising
   a. a frame having a base section and an upwardly inclined open front section and comprising a single length of wire defining a front transverse section, spaced side sections and a rear transverse section,
   b. a bail member mounted on the frame for pivotal movement toward and away from the upper end of the front section,
   c. the upper ends of the front sections and bail member being adapted to secure releasably thereto the open end of a litter bag for movement of the latter between open and closed positions,
   d. the rear transverse section of the frame including a pair of transverse lapping sections adapted to secure releasably therebetween the closed end of a litter bag.